United States Patent
Zhang et al.

(10) Patent No.: US 11,077,499 B2
(45) Date of Patent: Aug. 3, 2021

(54) LARGE-SCALE CONTROLLABLE PREPARATION METHOD FOR PLASMONIC NANONAIL STRUCTURE

(71) Applicant: Southeast University, Jiangsu (CN)

(72) Inventors: Xiaoyang Zhang, Jiangsu (CN); Tong Zhang, Jiangsu (CN); Xiaomei Xue, Jiangsu (CN); Yanyan Qin, Jiangsu (CN)

(73) Assignee: Southeast University, Jiangsu (CN)

( * ) Notice: Subject to any disclaimer, the term of this patent is extended or adjusted under 35 U.S.C. 154(b) by 0 days.

(21) Appl. No.: 16/976,079

(22) PCT Filed: May 28, 2018

(86) PCT No.: PCT/CN2018/088739
§ 371 (c)(1),
(2) Date: Aug. 27, 2020

(87) PCT Pub. No.: WO2019/165714
PCT Pub. Date: Sep. 6, 2019

(65) Prior Publication Data
US 2020/0398345 A1  Dec. 24, 2020

(30) Foreign Application Priority Data
Mar. 1, 2018  (CN) .......................... 201810171143.7

(51) Int. Cl.
*B22F 9/24* (2006.01)
*B01D 57/02* (2006.01)
(Continued)

(52) U.S. Cl.
CPC .............. *B22F 9/24* (2013.01); *B01D 57/02* (2013.01); *B22F 1/0044* (2013.01);
(Continued)

(58) Field of Classification Search
None
See application file for complete search history.

(56) References Cited

U.S. PATENT DOCUMENTS

2010/0272770 A1* 10/2010 De Windt ............. B22F 1/0018
424/411
2018/0297120 A1* 10/2018 Weizmann .............. C30B 29/34

FOREIGN PATENT DOCUMENTS

CN  103000754  3/2013
CN  103203459  7/2013
(Continued)

OTHER PUBLICATIONS

Ahuja, A., et al., "Nanonails: A Simple Geometrical Approach to Electrically Tunable Superlyophobic Surfaces", Langmuir, vol. 24, pp. 9-14, published on Web Oct. 12, 2007.*
(Continued)

*Primary Examiner* — George Wyszomierski
(74) *Attorney, Agent, or Firm* — JCIP Global Inc.

(57) ABSTRACT

A controllable preparation method for a plasmonic nanonail structure is provided. A size of a nanomaterial can be controlled at sub-wavelength. The nanomaterial has good localized surface plasmon resonance effect, and the optical, electrical and mechanical properties of the nanometer material all can be regulated. The plasmonic nanonail is composed of two parts, i.e., a silver nanorod, a gold nanorod or a silver-gold-silver alloy nanorod and an approximate equilateral triangular nano-silver plate growing on the nanorod. A length of the nanorod is controlled within 20-30 nanometers, a diameter of the nanorod is controlled within 10-200 nanometers, a side length of the triangular nano-silver plate is controlled within 20 nanometers to 2 microns, and a size of the triangular plate is less than or equal to the length of the nanorod.

20 Claims, 3 Drawing Sheets

(51) Int. Cl.
  *B22F 1/00*  (2006.01)
  *C22C 1/04*  (2006.01)
  *B82Y 30/00*  (2011.01)
  *B82Y 40/00*  (2011.01)

(52) U.S. Cl.
  CPC ...... *C22C 1/0466* (2013.01); *B22F 2301/255* (2013.01); *B82Y 30/00* (2013.01); *B82Y 40/00* (2013.01)

(56) References Cited

FOREIGN PATENT DOCUMENTS

| CN | 104404624 |   | 3/2015 |
|---|---|---|---|
| CN | 105879871 A | * | 8/2016 |
| CN | 106139145 |   | 11/2016 |

OTHER PUBLICATIONS

English translation of CN 105879871-A (originally published Aug. 24, 2016), obtained from Espacenet.*

Yun Yang, et al., "Controlled Growth of Ag/Au Bimetallic Nanorods through Kinetics Control." Chemistry of Materials, vol. 25, Dec. 6, 2012, pp. 34-41.

Srikanth Pedireddy, et al., "Synthesis of Spiky Ag—Au Octahedral Nanoparticles and Their Tunable Optical Properties." The Journal of Physics Chemistry, vol. 117, Jul. 23, 2013, pp. 16640-16649.

"International Search Report (Form PCT/ISA/210)" of PCT/CN2018/088739, dated Nov. 15, 2018, with English translation thereof, pp. 1-5.

* cited by examiner

LARGE-SCALE CONTROLLABLE PREPARATION METHOD FOR PLASMONIC NANONAIL STRUCTURE

CROSS-REFERENCE TO RELATED APPLICATION

This application is a continuation of international PCT application serial no. PCT/CN2018/088739, filed on May 28, 2018, which claims the priority benefit of Chinese application no. 201810171143.7, filed on Mar. 1, 2018. The entirety of each of the above-mentioned patent applications is hereby incorporated by reference herein and made a part of this specification.

BACKGROUND

Technical Field

The present invention relates to the fields of crystal growth, nano integrated optical devices, and nano optoelectronic materials, and in particular, to a controllable preparation method of a plasmonic nanonail optoelectronic material.

Description of Related Art

As people's researches on nanomaterials are continuously deepened, there are relatively mature preparation methods for all basic units such as zero-dimensional quantum dots, one-dimensional nanowires and nanorods, two-dimensional nanoplates, and three-dimensional nanotubes, and various nanomaterials has been widely used in a plurality of fields such as optoelectronic materials, chemical and biological sensing, and catalysis. However, performance of nanomaterials with monotonous structures has relatively large limitations. In the era in which technologies are continuously developed, there are an increasing quantity of demands for more novel and better performing nanomaterials and nanodevices. Preparation of nanomaterials with complex and diverse structures has become an inevitable tendency in the development of nanotechnologies.

Currently, a main method for manufacturing nanodevices with complex structures is still a "top-down" process. This process is relatively mature and can also accurately control size and morphologic properties of the prepared devices, but because of relatively complex implementation methods, only a small amount can be prepared at a time. Mass production cannot be achieved. Because of reasons such as energy consumption, the prepared devices are usually very expensive. There are a continuously increasing quantity of demands for nanomaterials from social development. To better meet the demands from social development, enhancing researches on preparation of nanomaterials will become an important part of the modern society. The chemical synthesis method is a "bottom-up" process. This method can realize mass and controllable production of nanodevices. The implementation method is relatively simple, and production costs can be greatly reduced. The chemical synthesis method is in line with the future development tendency of nanotechnologies.

Plasmonic materials are advanced nanomaterials at sub-wavelength, can break through limitations of the diffraction limit and greatly improve integration of optical devices, and have formed one of the hot research fields are developed rapidly in the world. With the development of nanoscaled synthesis and material processing technologies, plasmonic materials have extensive application prospects in many fields such as surface optoelectric field enhancement, spectral enhancement, nanowaveguides, photocatalysis, and biosensors. There is an urgent need to further improve efficiency of material preparation and control of a morphology and performance of a product, to obtain novel and complex plasmonic materials and devices with novel and complex structures and excellent performance.

SUMMARY

Technical Problem

An objective of the present invention is to overcome shortcomings of the prior art and provide a large-scale controllable preparation method of a plasmonic nanonail structure. The chemical method has simple synthesis process and good repeatability, is easy for industrial mass production, and compared with the expensive top-down process, can significantly reduce production costs. Morphologies and sizes of prepared plasmonic nanonail optoelectronic materials can all be accurately controlled, the thickness of a grown nanorod may be controlled by controlling the diameter of a decahedral core. A plasmonic nanonail formed by growing a silver triangular plate at a surface defect of the nanorod has a narrower spectrum and a larger-amplitude resonance effect in a visible to near-infrared band, and a broad application prospect in the fields of crystal growth, nano integrated optical devices, and nanoscaled optoelectric materials.

Technical Solution

A large-scale controllable preparation method for a plasmonic nanonail structure is provided, including the following steps:

for method 1: synthesis of a plasmonic nanonail with a silver nanorod as a backbone:

a. generating a silver decahedral core in a light-induced manner to control the thickness of a silver nanorod: preparing a mixed aqueous solution of a weak reducing agent A, a photocatalyst B, silver nitrate, and a surfactant C, then, quickly adding a strong reducing agent D into the mixed aqueous solution, when the solution to which the strong reducing agent D is added changes from light yellow to bright yellow, that is, when a large quantity of sliver ions are reduced to elemental silver, adding an etchant E, and performing illumination for 0.1-5 h, where under the screening effect of E, isotropic particles are etched into silver ions, and, under the traction effect of light irradiation, the silver ions are adsorbed on surfaces of decahedrons, and high-yield silver decahedrons are generated, to obtain a silver decahedral core aqueous solution I;

b. chemically reducing the obtained silver decahedral core aqueous solution I, to enable the silver decahedral core to grow along a longitudinal axis direction into a silver nanorod: heating a mixed aqueous solution of the weak reducing agent A and the surfactant C under the condition of 70-120° C., to obtain a solution having a reducing property, adding the silver decahedral core aqueous solution I to the solution, adding a silver nitrate solution multiple times, and growing the reduced silver ions along longitudinal axes of the silver decahedrons for multiple rounds, to obtain a silver nanorod aqueous solution II;

c. forming a plasmonic nanonail at a surface defect of a silver rod through growth: thoroughly dissolving silver nitrate and the surfactant C into dimethylformamide (DMF) to obtain a solution III; thoroughly washing the silver nanorod aqueous solution II, adding a surface treatment agent F to obtain a solution IV, and treating an originally smooth surface of the silver nanorod by using the surface treatment agent F, to form one or more defects after washing; thoroughly mixing the silver nanorod with the solutions III and IV, and placing the mixture under a condition of 60-150° C. for sufficient reaction, where free silver ions are reduced at the defect, and form a triangular plate under the adsorption effect of C, that is, a plasmonic nanonail DMF-water mixed solution is obtained; and d. separating the nanonail from impurities by using an electrophoresis method to further achieve a controllable morphology: adding 1.5% agarose gel into a casting tank of an electrophoresis tank, letting the agarose gel stand at room temperature until the agarose gel is completely solidified, removing a tape, placing the agarose gel and a inner tank into the electrophoresis tank, adding an electrophoresis buffer solution to 1-2 mm above a cassette, adding the plasmonic nanonail DMF-water mixed solution to a sample tank of the cassette, and energizing the electrophoresis tank for electrophoresis, where because the particle size of nanosphere particles is much smaller than that of the nanonail, nanospheres move at a high speed, and a movement speed of the nanonail is low, so that impurities, such as the nanospheres, can be separated from the nanonail to obtain uniformly dispersed plasmonic nanonails, to further achieve the controllable morphology;

for method 2: synthesis of an alloy-type plasmonic nanonail with a gold nanorod as a backbone:

a. synthesizing a gold decahedral core: preparing a mixed aqueous solution of a weak reducing agent A and tetrachloroauric acid, and then, quickly adding a strong reducing agent I into the mixed aqueous solution to thoroughly react to obtain a gold decahedral core aqueous solution V;

b. performing chemical reduction to make the gold decahedral core grow into a gold nanorod along a longitudinal axis direction: preparing an aqueous solution of the weak reducing agent A, the tetrachloroauric acid, and a surfactant K, and adding the gold decahedral core solution V into the solution multiple times, where the reduced elemental gold grows for multiple rounds along a longitudinal axis of a gold decahedron to obtain a gold nanorod aqueous solution VI;

c. forming an alloy nanonail at a surface defect of a gold rod through growth: thoroughly dissolving silver nitrate and a surfactant C into dimethylformamide (DMF) to obtain a solution III; thoroughly washing the gold nanorod aqueous solution VI, adding a proper amount of surface treatment agent F to obtain a solution VII, and treating an originally smooth surface of the gold nanorod by using the surface treatment agent F, to form one or more defects after washing; thoroughly mixing the gold nanorod with the solutions III and IV, and placing the mixture under a condition of 60-150° C. for sufficient reaction, where free silver ions are reduced at the defect, and form a triangular plate under the adsorption effect of C, that is, a gold-silver alloy-type plasmonic nanonail DMF-water solution is obtained; and d. separating the nanonail from impurities by using an electrophoresis method to further achieve a controllable morphology: adding 0.5%-3% agarose gel into a casting tank of an electrophoresis tank, letting the agarose gel stand at room temperature until the agarose gel is completely solidified, removing a tape, placing the agarose gel and a inner tank into the electrophoresis tank, adding an electrophoresis buffer solution to 1-2 mm above a cassette, adding the gold-silver alloy-type plasmonic nanonail DMF-water solution to a sample tank of the cassette, and energizing the electrophoresis tank for electrophoresis, where because the particle size of nanosphere particles is much smaller than that of the nanonail, nanospheres move at a high speed, and a movement speed of the nanonail is low, so that impurities, such as the nanospheres, can be separated from the nanonail to obtain uniformly dispersed alloy-type plasmonic nanonails, to further achieve the controllable morphology; and for method 3: synthesis of an alloy-type plasmonic nanonail with a silver-gold-silver nanorod as a backbone:

a. synthesizing a silver-gold-silver alloy nanorod by using a chemical reduction method: adding a large amount of cationic surfactant cetyltrimethylammonium chloride (CTAC) solution to a gold nanorod aqueous solution VI, to make a concentration of CTAC in the gold nanorod aqueous solution range from 0.05-2 mol/L, where CTAC with a high concentration is adsorbed on a surface of the gold nanorod, reduces a zeta potential of the gold nanorod, and flocculates, thereby effectively extracting the gold nanorod; formulating the extracted gold nanorod to a benzyldimethylhexadecyl ammonium chloride (BDAC) solution with a concentration of 0.01-10 mmol/L, slowly adding silver nitrate and a weak reducing agent A solution separately and simultaneously into the solution at a rate of 100-400 µL/h, and thoroughly reacting at a temperature of 40-100° C. for 2-6 h, where silver ions are reduced by A and grow along two ends of the gold nanorod, to obtain a silver-gold-silver alloy nanorod solution VIII;

b. forming an alloy-type plasmonic nanonail at a surface defect of a silver-gold-silver alloy nanorod through growth: thoroughly mixing and stirring silver nitrate and a DMF solution of a surfactant C to obtain a solution III; thoroughly washing the silver-gold-silver alloy nanorod aqueous solution VIII at a high speed, adding a proper amount of surface treatment agent F, treating an originally smooth surface of the alloy nanorod by using the surface treatment agent F, to form one or more defects after washing, and obtaining a solution IX; thoroughly mixing the solutions IX and III, and placing the mixture under a condition of 60-150° C. for sufficient reaction, to obtain a silver-gold-silver alloy-type plasmonic nanonail DMF-water solution; and c. separating the nanonail from impurities by using an electrophoresis method to further achieve a controllable morphology: adding 1.5% agarose gel into a casting tank of an electrophoresis tank, letting the agarose gel stand at room temperature until the agarose gel is completely solidified, removing a tape, placing the gel and the inner tank into the electrophoresis tank, adding an electrophoresis buffer solution to 1-2 mm above a cassette, adding the gold-silver alloy-type plasmonic nanonail DMF-water solution to a sample tank of the cassette, and energizing the electrophoresis tank for electrophoresis, where because the particle size of nanosphere particles is much smaller than that of the nanonail, nanospheres move at a high speed, and a movement speed of the nanonail is low, so that impurities, such as the nanospheres, can be separated from the nanonail to obtain uniformly dispersed alloy-type plasmonic nanonails, to further achieve the controllable morphology.

The weak reducing agent A is sodium citrate, glucose, or ascorbic acid, the photocatalyst B is L-arginine, the strong reducing agent D is sodium borohydride, potassium borohydride, or lithium aluminum hydride, and the etchant E is hydrogen peroxide, where a ratio of amounts of substances of sodium citrate, L-arginine, silver nitrate, and sodium borohydride is 1.68:(0.001-5):(0.05-10):(0.05-10).

The surfactant C is polyvinylpyrrolidone (PVP) with a molecular weight of 40,000-1,300,000 Daltons and more, or sodium polyvinyl sulfonate PSS, and polyacrylic acid (PAA); and concentrations of the added PVP in the silver decahedral core aqueous solution I, the silver nanorod aqueous solution II, and the solution III range from 0.001-1 mmol/L.

The surface treatment agent F is acetone, toluene, cyclopentanone, DMF, hydrogen peroxide, hydrochloric acid, or nitric acid, where concentrations of the surface treatment agent in the solution IV, the solution VII, and the solution IX range from 0.001-10 mmol/L; and the surfactant K is CTAB or CTAC.

A ratio of amounts of substances of the silver nitrate solution, the PVP solution, and the nanorod solution is 400:(20-500):(0.01-10).

The thickness of the silver nanorod, the gold nanorod, and the silver-gold-silver alloy nanorod can be controllably changed by changing the size of a decahedral seed, a small diameter of the seed indicates a thin prepared nanorod, and a large diameter of the seed indicates a thick prepared nanorod; and when the diameter of the nanorod is approximately 20 nanometers, a resonance peak of a spectral characteristic curve is located at approximately 400 nanometers, and when the diameter of the nanorod is approximately 60 nanometers, the resonance peak may be red-shifted to 420 nanometers.

Advantageous Effect

1. Conventional nanomaterials only support one resonance mode. The plasmonic nanonail optoelectric material prepared in the present invention can support both nanorod and triangular nanoplate resonance modes. The modes compete with each other, so that a nanonail resonant cavity can generate a single or multiple resonance peaks with a narrow linewidth, exhibiting unique spectral characteristics. The plasmonic nanonail prepared in the present invention is orderly, controllable, and uniform, and therefore, has a narrower spectrum and a larger-amplitude resonance effect in a visible to near-infrared band, so that the resonant cavity has a high Q value. The Q value of a nanosphere resonant cavity is approximately 5-10, the Q value of the triangular nanoplate is approximately 10-15, and the Q value of the plasmonic nanonail resonance cavity is approximately 400-1000, which is higher than the former two. The characteristics make the plasmonic nanonail optoelectric material applicable to preparation of novel high-performance nanolasers, active light-emitting devices, and the like, and the plasmonic nanonail optoelectric material is expected to greatly promote development of nanoscaled optoelectric materials and even the whole field of optics.

2. Although the conventional top-down process can accurately control a morphology of a product, an implementation method is complex and expensive, only a small amount can be prepared at a time, and mass production cannot be achieved. The preparation method of a plasmonic nanonail optoelectric material according to the present invention is advanced, has low costs, and can achieve mass production, and a morphology of a product can be accurately controlled.

3. In the method of the present invention, influence of external factors, such as oxygen in the air, do not need to be considered, in addition, the chemical reagents used are also all non-toxic and environmental friendly, a heating temperature is low, and an experiment period is short. The devices and processes used in the present invention are simple, and operation processes are convenient. Therefore, the method is a simple, flexible, and low-energy synthesis method, and can be widely applied from the perspective of green chemistry.

DESCRIPTION OF THE EMBODIMENTS

Figure 1:
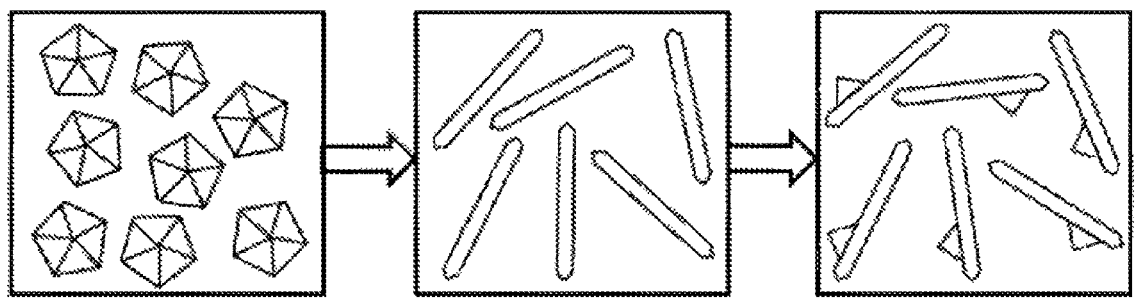
FIG. 1 is a schematic diagram of a whole process of growing a plasmonic nanonail with a silver nanorod as a backbone, where the left diagram shows a synthesized silver decahedral seed, the middle diagram shows a silver nanorod grown from the seed, and the right diagram shows a finally obtained plasmonic nanonail.
Figure 2:
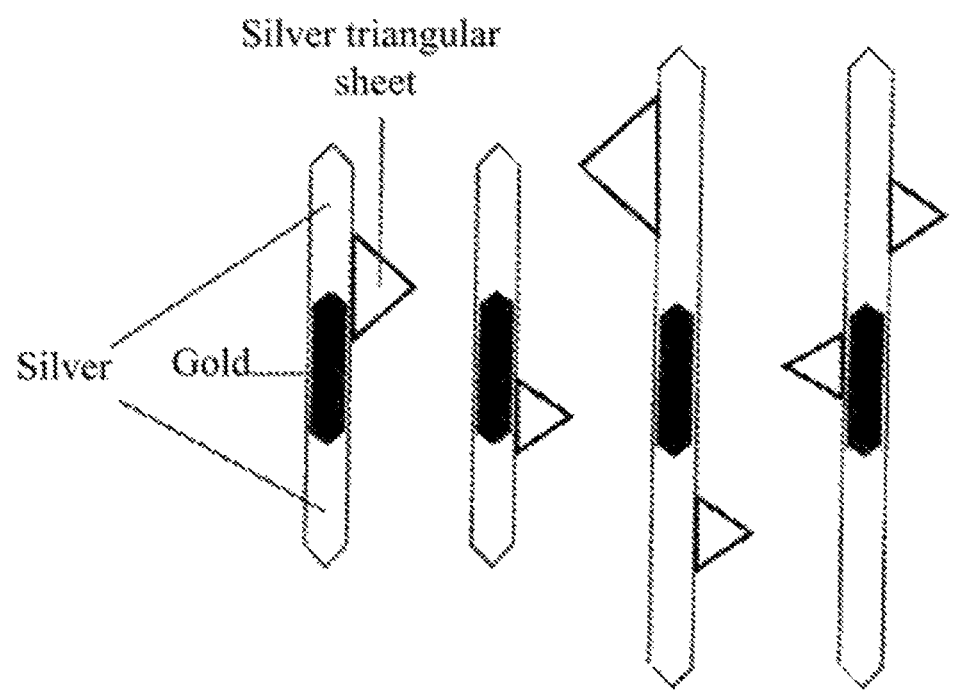
FIG. 2 is a schematic diagram of an alloy-type plasmonic nanonail with a silver-gold-silver nanorod as a backbone.
Figure 3:
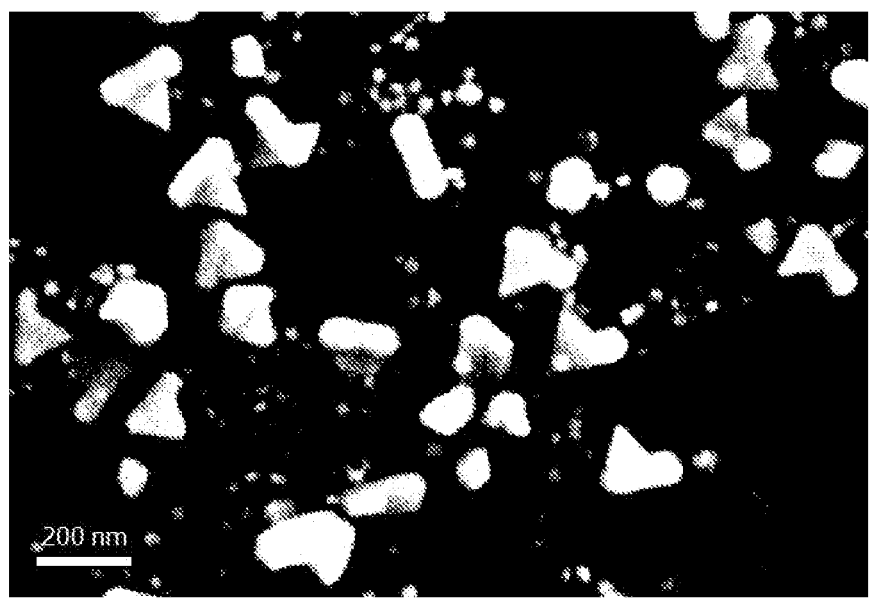
FIG. 3 and FIG. 4 are both SEM photos of a plasmonic nanonail with a silver nanorod as a backbone, where a nanorod used in FIG. 3 is shorter, and in FIG. 4, when an ultra-thin silver nanowire with a larger length and a smaller diameter is used as a backbone, a silver nanonail is also successfully prepared, indicating that the length and the thickness of the silver nanorod are controllable.
Figure 4:
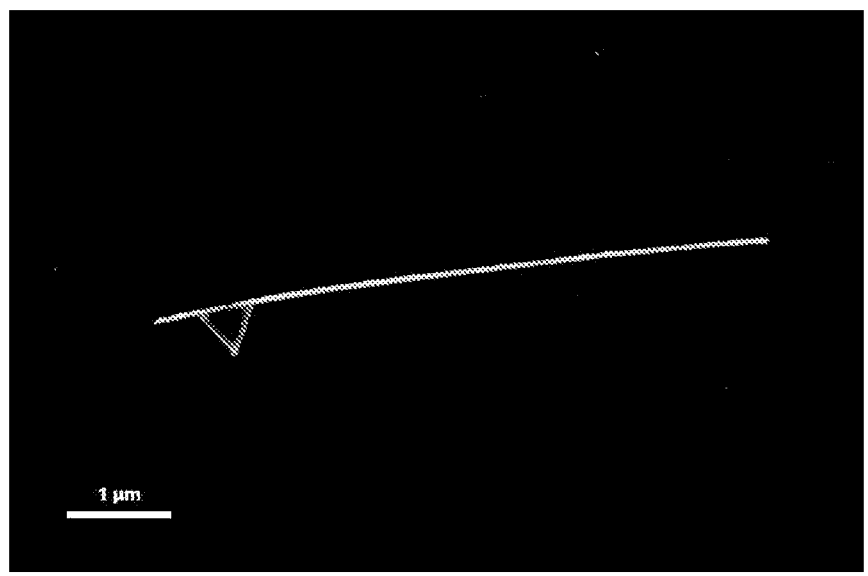
Figure 5:
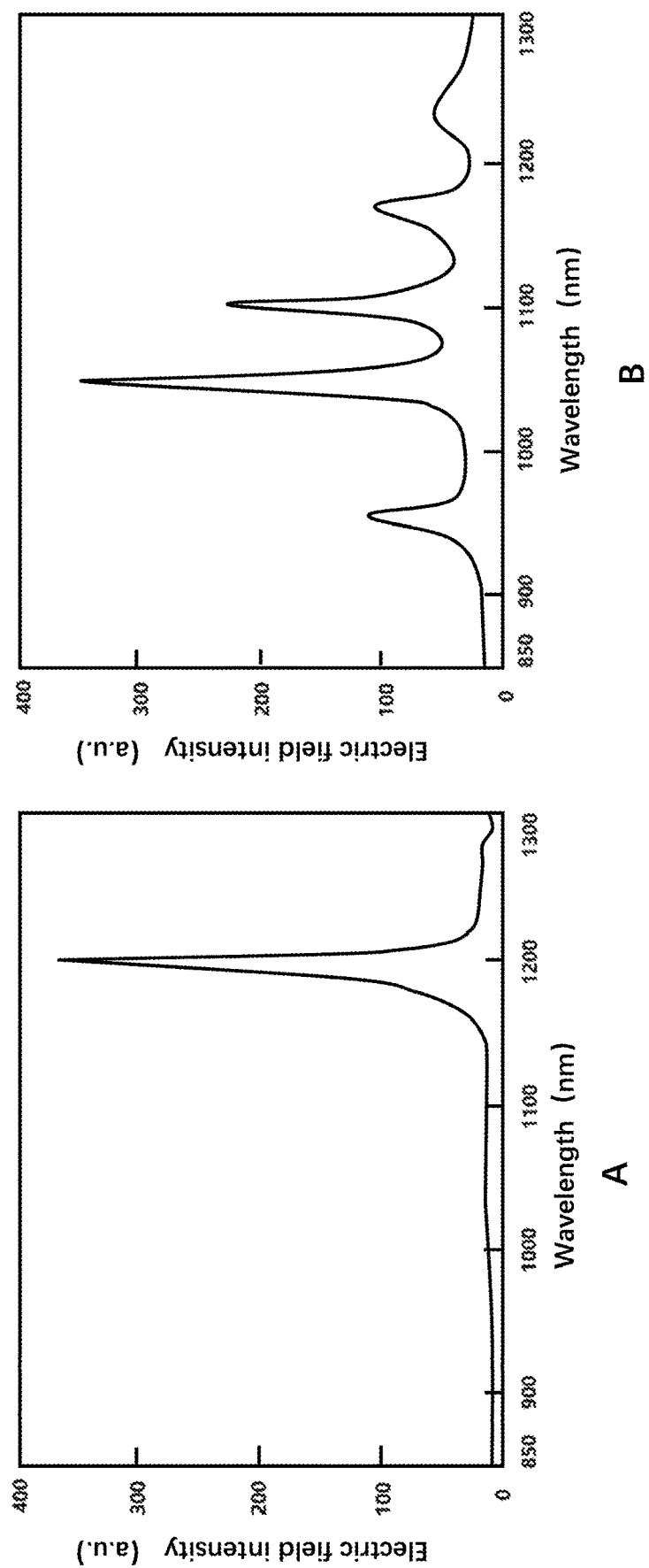
FIG. 5 is a surface plasmon resonance spectra of nanonail resonance cavities with different morphologies, where a nanonail resonance cavity corresponding to a diagram A produces a single resonance peak with a narrow linewidth, and a nanonail resonance cavity corresponding to a diagram B produces multiple resonance peaks with narrow linewidths.

According to the method of the present invention, an experimenter may prepare a plasmonic nanonail with a controllable morphology, including a silver nanorod, a gold nanorod, or a silver-gold-silver alloy nanorod and a triangular nano-silver plate. The length of the nanorod is controlled within 20 nanometers and 30 microns, and the diameter thereof is controlled within 10-200 nanometers. The side length of the triangular nano-silver plate is controlled within 20 nanometers to 2 microns, and the size of the triangular plate is less than or equal to the length of the nanorod.

The present invention provides a large-scale controllable preparation method for a plasmonic nanonail structure, specifically including the following steps:

for method 1: synthesis of a plasmonic nanonail with a silver nanorod as a backbone:

a. generating a silver decahedral core in a light-induced manner to control the thickness of a silver nanorod: preparing a mixed aqueous solution of a weak reducing agent A, a photocatalyst B, silver nitrate, and a surfactant C, then, quickly adding a strong reducing agent D into the mixed solution, when the solution changes from light yellow to bright yellow, that is, when a large quantity of sliver ions are reduced to elemental silver, adding a proper amount of etchant E, and performing illumination for 0.1-5 h, where under the screening effect of E, isotropic particles are etched into silver ions, and, under the traction effect of light irradiation, the silver ions are adsorbed on surfaces of decahedrons, and high-yield silver decahedrons are generated, to obtain a silver decahedral core aqueous solution I;

b. chemically reducing the obtained silver decahedral core aqueous solution I, to enable the silver decahedral core to grow along a longitudinal axis direction into a silver nanorod: heating a mixed aqueous solution of the weak reducing agent A and the surfactant C under the condition of 70-120° C., to obtain a solution having a reducing property, adding the silver decahedral core aqueous solution I to the solution, adding a silver nitrate solution multiple times, and growing the reduced silver ions along longitudinal axes of the silver decahedrons for multiple rounds, to obtain a silver nanorod aqueous solution II;

c. forming a plasmonic nanonail at a surface defect of a silver rod through growth: thoroughly dissolving silver nitrate and the surfactant C into dimethylformamide (DMF) to obtain a solution III; thoroughly washing the silver nanorod aqueous solution II, adding a proper amount of surface treatment agent F to obtain a solution IV, and treating an originally smooth surface of the silver nanorod by using F, to form one or more defects after washing; thoroughly mixing the silver nanorod with the solutions III and IV, and placing the mixture under a condition of 60-150° C. for sufficient reaction, where free silver ions are reduced at the defect, and form a triangular plate under the adsorption effect of C, that is, a plasmonic nanonail DMF-water mixed solution is obtained; and d. separating the nanonail from impurities by using an electrophoresis method to further achieve a controllable morphology: adding 1.5% agarose gel into a casting tank of an electrophoresis tank, letting the agarose gel stand at room temperature until the gel is completely solidified, removing a tape, placing the agarose gel and an inner tank into the electrophoresis tank, adding an electrophoresis buffer solution to 1-2 mm above a cassette, adding the plasmonic nanonail DMF-water mixed solution to a sample tank of the cassette, and energizing the electrophoresis tank for electrophoresis, where because the particle size of nanosphere particles is much smaller than that of the nanonail, nanospheres move at a high speed, and a movement speed of the nanonail is low, so that impurities, such as the nanospheres, can be separated from the nanonail to obtain uniformly dispersed plasmonic nanonails, to further achieve the controllable morphology;

for method 2: synthesis of an alloy-type plasmonic nanonail with a gold nanorod as a backbone:

a. synthesizing a gold decahedral core: preparing a mixed aqueous solution of a weak reducing agent A and tetrachloroauric acid, and then, quickly adding a strong reducing agent I into the mixed aqueous solution to thoroughly react to obtain a gold decahedral core aqueous solution V;

b. performing chemical reduction to make the gold decahedral core grow into a gold nanorod along a longitudinal axis direction: preparing an aqueous solution of the weak reducing agent A, the tetrachloroauric acid, and a surfactant K, and adding the gold decahedral core solution V into the solution multiple times, where the reduced elemental gold grows for multiple rounds along a longitudinal axis of a gold decahedron to obtain a gold nanorod aqueous solution VI;

c. forming an alloy nanonail at a surface defect of a gold rod through growth:

thoroughly dissolving silver nitrate and a surfactant C into dimethylformamide (DMF) to obtain a solution III; thoroughly washing the gold nanorod aqueous solution VI, adding a proper amount of surface treatment agent F to obtain a solution VII, and treating an originally smooth surface of the gold nanorod by using the surface treatment agent F, to form one or more defects after washing; thoroughly mixing the gold nanorod with the solutions III and IV, and placing the mixture under a condition of 60-150° C. for sufficient reaction, where free silver ions are reduced at the defect, and form a triangular plate under the adsorption effect of C, that is, a gold-silver alloy-type plasmonic nanonail DMF-water solution is obtained; and d. separating the nanonail from impurities by using an electrophoresis method to further achieve a controllable morphology: adding 1.5% agarose gel into a casting tank of an electrophoresis tank, letting the agarose gel stand at room temperature until the gel is completely solidified, removing a tape, placing the gel and the inner tank into the electrophoresis tank, adding an electrophoresis buffer solution to 1-2 mm above a cassette, adding the gold-silver alloy-type plasmonic nanonail DMF-water solution to a sample tank of the cassette, and energizing the electrophoresis tank for electrophoresis, where because the particle size of nanosphere particles is much smaller than that of the nanonail, nanospheres move at a high speed, and a movement speed of the nanonail is low, so that impurities, such as the nanospheres, can be separated from the nanonail to obtain uniformly dispersed alloy-type plasmonic nanonails, to further achieve the controllable morphology; and for method 3: synthesis of an alloy-type plasmonic nanonail with a silver-gold-silver nanorod as a backbone:

a. synthesizing a silver-gold-silver alloy nanorod by using a chemical reduction method: adding a large amount of cationic surfactant cetyltrimethylammonium chloride (CTAC) solution to a gold nanorod aqueous solution VI, to make a concentration of CTAC in the gold nanorod aqueous solution range from 0.05-2 mol/L, where CTAC with a high concentration is adsorbed on a surface of the gold nanorod, reduces a zeta potential of the gold nanorod, and flocculates, thereby effectively extracting the gold nanorod; formulating the extracted gold nanorod to a benzyldimethylhexadecyl ammonium chloride (BDAC) solution with a concentration of 0.01-10 mmol/L, slowly adding silver nitrate and a weak reducing agent A solution separately and simultaneously into the solution at a rate of 100-400 μL/h, and thoroughly reacting at a temperature of 40-100° C. for 2-6 h, where silver ions are reduced by A and grow along two ends of the gold nanorod, to obtain a silver-gold-silver alloy nanorod solution VIII;

b. forming an alloy-type plasmonic nanonail at a surface defect of a silver-gold-silver alloy nanorod through growth: thoroughly mixing and stirring silver nitrate and a DMF solution of a surfactant C to obtain a solution III; thoroughly washing the silver-gold-silver alloy nanorod aqueous solution VIII at a high speed, adding a proper amount of surface treatment agent F, treating an originally smooth surface of the alloy nanorod by using the surface treatment agent F, to form one or more defects after washing, and obtaining a solution IX; thoroughly mixing the solutions IX and III, and placing the mixture under a condition of 60-150° C. for sufficient reaction, to obtain a silver-gold-silver alloy-type plasmonic nanonail DMF-water solution; and c. separating the nanonail from impurities by using an electrophoresis method to further achieve a controllable morphology: adding 1.5% agarose gel into a casting tank of an electrophoresis tank, letting the agarose gel stand at room temperature until the gel is completely solidified, removing a tape, placing the agarose gel and a inner tank into the electrophoresis tank, adding an electrophoresis buffer solution to 1-2 mm above a cassette, adding the silver-gold-silver alloy-type plasmonic nanonail DMF-water solution to a sample tank of the cassette, and energizing the electrophoresis tank for electrophoresis, where because the particle size of nanosphere particles is much smaller than that of the nanonail, nanospheres move at a high speed, and a movement speed of the nanonail is low, so that impurities, such as the nanospheres, can be separated from the nanonail to obtain uniformly dispersed alloy-type plasmonic nanonails, to further achieve the controllable morphology.

The weak reducing agent A is a reagent having a weak reducing property such as sodium citrate, glucose, or vitamin C, the photocatalyst B is L-arginine, the strong reducing agent D is a reagent having a strong reducing property such as sodium borohydride, potassium borohydride, or lithium aluminum hydride, and the etchant E is hydrogen peroxide, where a ratio of amounts of substances of sodium citrate, L-arginine, silver nitrate, and sodium borohydride is 1.68:(0.001-5):(0.05-10):(0.05-10).

The surfactant C is a high molecular polymer with a crystal face selection property such as polyvinylpyrrolidone (PVP) with a molecular weight of 40,000-1,300,000 Daltons and more, or sodium polyvinyl sulfonate PSS, and polyacrylic acid (PAA); and concentrations of the added PVP in the silver decahedral core aqueous solution I, the silver nanorod aqueous solution II, and the solution III range from 0.001-1 mmol/L.

The surface treatment agent F is a reagent that can cause a defect to a surface of a product such as acetone, toluene, cyclopentanone, DMF, hydrogen peroxide, hydrochloric acid, or nitric acid, where concentrations of the surface treatment agent in the solution IV, the solution VII, and the solution IX range from 0.001-10 mmol/L; and the surfactant K is CTAB or CTAC.

A ratio of amounts of substances of the silver nitrate solution, the PVP solution, and the nanorod solution in step (c) of the method 1, step (c) of the method 2, and step (d) of the method 3 is 400:(20-500):(0.01-10).

The thickness of the prepared nanorod can be controllably changed by changing the size of a decahedral seed, and a small diameter of the seed indicates a thin prepared nanorod, and a large diameter of the seed indicates a thick prepared nanorod. When the diameter of the nanorod is approximately 20 nanometers, a resonance peak of a spectral characteristic curve is located at approximately 400 nanometers, and when the diameter of the nanorod is approximately 60 nanometers, the resonance peak may be red-shifted to approximately 420 nanometers.

A nanonail synthesized by using a silver nanorod, a gold nanorod, a gold-silver alloy nanorod, or a semiconductor nanorod and by using the present invention falls within the protection scope of the present invention. In addition, the silver material of the synthesized triangular plate can also be replaced with a plasmonic metal material such as gold, copper, or aluminum, and alloys thereof, and a plasmonic material such as a doped semiconductor.

A plasmonic metal nanorod and nanoplate, as classic nanostructures, both have a surface plasmon resonance effect, and can form, together with incident light, electron disperse-dense waves spread along a metal-air interface, and have a strong restraint on light. A nanorod and a triangular nanoplate have different structures, and therefore, exhibit respective unique spectral resonance characteristics.

A one-dimensional nanorod is an anisotropic nanostructure, and interacts with incident light to form a surface plasmon resonance, to enable light to be spread along the nanorod and reflected on two ends of the nanorod, and multi-beam interference forms a Fabry-Perot (FP) cavity mode. Mode light whose wavelength meets a phase matching condition resonates and is strengthened during transmission, forming a series of surface plasmon resonance peaks, but resonance peak intensity thereof is low. A larger length of a silver nanorod indicates a longer equivalent optical path of the FP cavity, a smaller distance between adjacent resonance modes, and a larger quantity of formed resonance peaks.

A two-dimensional nanoplate is also an anisotropic nanostructure. For a silver triangular nanoplate, incident light irradiating a surface of the nanoplate excites a localized surface plasmon resonance (LSPR), and a formed surface plasmon resonance peak is a single peak with a relatively broad spectral linewidth. In addition, in a resonance state, light is localized at a tip of the triangular plate, that is, the triangular plate has the significant localized tip enhancement effect and a single-resonance peak characteristic. When the width of the triangular plate increases, a main resonance peak thereof is continuously red-shifted, but intensity thereof decreases. When the size increases to hundreds of nanometers, a high-order resonance peak appears, forming an echo wall resonance cavity mode.

For a plasmonic metal nanoparticle, a size, a shape and a structure have significant effects on its optical properties. A novel plasmonic nanonail structure formed from a nanorod through epitaxial growth has new characteristics on the basis of inheriting characteristics of a single structure. The plasmonic nanonail is constituted by a silver nanorod, a gold nanorod, or a silver-gold-silver alloy nanorod with a controllable length and a silver triangular nanoplate epitaxially grown thereon. The theory shows that when the length of the nanorod is unchanged, if the size of the triangular plate is increased, a resonance spectrum of the nanonail is red-shifted and intensity thereof is weakened. A contour of the nanonail is the same as that of a LSPR resonance peak of a silver triangular plate with a corresponding size, but the resonance spectrum of the nanonail is constituted by a plurality of narrow resonance peaks, and a distance between the peaks is the same as a distance between resonance peaks of FP cavities of silver nanorods with a corresponding length. This shows that the resonance spectrum of the nanonail has both an LSPR resonance characteristic and an FP cavity resonance characteristic. In addition, the nanonail also has new resonance spectral characteristics: first, compared with a nanorod and a triangular nanoplate that are separate, the nanonail has a narrower spectrum and a larger-amplitude resonance effect in a visible to near-infrared band; secondly, an equivalent optical path of the FP cavity thereof can be increased by growing a longer nanorod, to increase a quantity of resonance peaks; and finally, the overall resonance spectrum of the nanorod may be red-shifted by adjusting the size of the triangular nanoplate.

In addition to an elemental nanorod, a silver-gold-silver alloy nanorod may also be used as the nanorod used for growing the nanonail. A novel silver-gold-silver alloy nanorod formed by using a gold nanorod as a core and depositing silver symmetrically and uniformly on a surface and both ends of the gold nanorod exhibits new characteristics while inheriting respective characteristics of the gold nanorod and the silver nanorod. Compared with an extinction spectrum of a silver nanorod with the same length, all modes of an extinction spectrum of the alloy nanorod are significantly red-shifted. A spectral line of the spectrum in the visible to near-infrared band is similar to a spectral line of the silver nanorod in the same band. A plurality of dense small resonance peaks appear in a short-wavelength spectral band, so that a high-energy spectrum thereof exhibits completely different unique spectral characteristics. In addition, a spectral linewidth of the extinction spectrum of the alloy nanorod structure in an infrared band is also significantly reduced, so that the alloy nanorod structure has a higher quality factor.

The quality factor (Q value) is a quantity representing a ratio of energy stored in a system to an average power loss when a resonance device resonates, and can reflect a capacity of storing energy inside a resonance cavity. More energy stored in the cavity or less energy loss per second indicates better quality of the resonance cavity and a higher Q value.

The preparation method includes a plurality of steps, and each step may be accurately controlled. A decahedral core is generated in a light-induced manner, and the decahedral core is enabled to grow along a longitudinal axis direction of the decahedral core into a nanorod by using a chemical reduction method, where the diameter of the decahedral core can be changed by changing a wavelength of irradiating light, so that the thickness of the grown nanorod can be controlled. The nanorod is processed by using a surfactant, to make one or more defects appear on a smooth surface thereof, and a triangular plate is grown at the defect, to obtain a nanonail solution. Impurities, such as nanospheres, mixed in the nanonail solution are removed by using an electrophoresis separation method, so that a uniformly dispersed plasmonic nanonail material can be obtained, to further achieve a controllable morphology.

A yield of a gold nanorod is higher than that of the silver nanorod. Using the gold nanorod as a core, a novel silver-gold-silver alloy nanorod is formed by depositing silver symmetrically and uniformly on a surface and two ends of the gold nanorod, and a silver triangular plate grows on the alloy nanorod to form an alloy-type plasmonic nanonail. The three resonance modes generated by the gold nanorod, the silver nanorod, and the silver triangular plate compete with each other, so that the nanonail resonant cavity can generate a single or multiple resonance peaks with a narrow linewidth, making the silver-gold-silver alloy nanonail exhibit unique spectral characteristics.

In the method of the present invention, a morphology of a product can be precisely controlled, and the prepared novel plasmonic nanonail can further improve a resonance spectrum of a monotonous classic nanostructure, and has the characteristics that a monotonous microstructure does not have, i.e., the adjustable narrow-band resonance enhancement effect and a high Q value. The novel plasmonic nanonail microstructure resolves the previously reported problem that a silver nanowire with a relatively small diameter cannot be effectively excited due to wave vector mismatch. When the diameter of the nanorod decreases, a wave vector thereof increases, making it difficult for a conventional coupling method to resolve a wave vector mismatch problem and the nanorod incapable of passing light. A silver triangular nanoplate grows on the nanorod. The triangular plate can be used as an excitation end. Incident light irradiates a surface of the triangular plate to increase a wave vector of a light wave and effectively excite a surface plasmon resonance wave, so that the nanorod can be exited to pass light. The triangular plate may alternatively function as a directional scattering center, to effectively convert the surface plasmon resonance wave transmitted from the nanorod into a light wave and scatter it into free space. Such an antenna effect of the plasmonic nanonail enables the plasmonic nanonail to be applied to development of various nano-optical antennas.

The characteristics make the application prospects of the plasmonic nanonail far higher than the nanorod and the triangular nanoplate, and the plasmonic nanonail can be used to develop nano-integrated optical devices with novel functions, and have important application prospects in the field of nano-integrated optical devices in the future.

The present invention is further described below with reference to the accompanying drawing and specific implementations.

Example 1

1. Synthesis of a Plasmonic Nanonail with a Silver Nanorod as a Backbone:
    (1) Grow a Decahedral Core in a Light-Induced Manner
    0.52 ml of 0.5 M sodium citrate, 15 µl of 0.5 M PVP (molecular weight: 40 k), 0.05 ml of 0.05 M L-arginine, and 0.4 ml of 0.05 M silver nitrate were added into 150 ml of water, the mixture was stirred for 5 min, then 2 ml of 0.1 M sodium borohydride was added, the mixture was continuously stirred for 45 min, a small amount of hydrogen peroxide solution was added, and the mixed solution was stirred for 25 min, and then, was irradiated by light for 2 h to obtain a silver decahedral solution.
    (2) Chemically Reduce a Silver Nanorod
    0.72 ml of 0.5 M sodium citrate and 0.135 ml of 0.5 M PVP were added to 60 ml water, the mixed solution was heated and stirred at 115° C. for 10 min, 0.4 ml of 0.05 M silver nitrate was added, the silver decahedron prepared in step (1) was added at the same time, the heating was stopped after 10 min, and the silver nanorod solution was obtained.
    (3) Epitaxially Grow an Ingot into a Nanonail
    The nanorod solution prepared in step (2) was centrifuged, a supernatant was removed, and a DMF solution was added to reach 4 ml. 4.5 ml of a DMF solution, 0.34 g of silver nitrate, and 55.5 mg of PVP (molecular weight: 1300 k) were thoroughly mixed and stirred for 10 min, then, 0.5 ml of the nanorod solution obtained through separation and purification was added, and the mixture was heated at 60° C. for 1 hour, to obtain a silver nanonail.

2. Synthesis of a Plasmonic Nanonail with a Silver-Gold-Silver Alloy Nanorod as a Backbone:
    (1) Synthesize a Gold Decahedral Core
    20 ml of a mixed aqueous solution containing 0.25 mM sodium citrate and 0.125 mM tetrachloroauric acid was thoroughly mixed and stirred for 10 min at room temperature, then 600 µl of 0.1 M sodium borohydride was added, and the mixed solution was stirred at room temperature for 40 min to obtain a gold decahedral core solution;
    (2) Chemically Reduce a Gold Nanorod
    500 ml of a mixed aqueous solution containing 0.313 mM ascorbic acid, a 0.125 mM tetrachloroauric acid solution, and 8 mM CTAB was thoroughly and slowly stirred at 20° C., and 750 µl of gold decahedral core solution was added, and the mixed solution was heated and stirred continuously until the reaction stopped, to obtain a gold nanorod solution.
    (3) Synthesize a Silver-Gold-Silver Alloy Nanorod:
    The gold nanorod solution was diluted to 0.1 M, 67.5 ml of 25 wt % CTAC solution was added to obtain a supernatant and a flocculent gold nanorod precipitate, the supernatant was removed, the precipitate was uniformly dispersed in the 10 mM BDAC solution, and the mixed solution was thoroughly stirred at 60° C.; and silver nitrate and a vitamin C solution were slowly dropped into the solution simultaneously at a drip rate of 300 µL/h, and the silver nanorod uniformly and symmetrically grew on two ends of the gold nanorod to obtain a silver-gold-silver composite nanorod solution VII.
    (4) Epitaxially Grow an Ingot into a Silver Nanonail
    The nanorod solution prepared in step (3) was centrifuged, a supernatant was removed, and a DMF solution was added to reach 4 ml. 4.5 ml of a DMF solution, 0.34 g of silver nitrate, and 55.5 mg of PVP (molecular weight: 1300 k) were thoroughly mixed and stirred for 10 min, then, 0.5 ml of the nanorod solution obtained through separation and purification was added, and the mixture was heated at 60° C. for 1 hour, to obtain a silver nanonail.

A nanonail synthesized by using a silver nanorod, a gold nanorod, a silver-gold-silver alloy nanorod, or a semiconductor nanorod and by using the present invention falls within the protection scope of the present invention. In addition, the silver material of the synthesized triangular plate can also be replaced with a plasmonic metal material such as gold, copper, or aluminum, and alloys thereof, and a plasmonic material such as a doped semiconductor.

What is claimed is:

1. A large-scale controllable preparation method for synthesizing a plasmonic nanonail with a silver nanorod as a backbone, wherein the method comprises:
   a. preparing a mixed aqueous solution of a weak reducing agent A, a photocatalyst B, silver nitrate, and a surfactant C, then, adding a strong reducing agent D into the mixed aqueous solution, when a quantity of sliver ions are reduced to elemental silver, adding an etchant E, and performing illumination for 0.1-5h, wherein under a screening effect of E, isotropic particles are etched into silver ions, and, under a traction effect of light irradiation, the silver ions are adsorbed on surfaces of decahedrons, and high-yield silver decahedrons are generated to obtain a silver decahedral core aqueous solution I in a light-induced manner so as to control a thickness of the silver nanorod;
   b. heating a mixed aqueous solution of the weak reducing agent A and the surfactant C under the condition of 70-120° C. to obtain a solution having a reducing property, adding the silver decahedral core aqueous solution I to the solution having the reducing property to chemically reduce the silver decahedral core aqueous solution I, adding a silver nitrate solution multiple times, and growing the reduced silver ions along longitudinal axes of the silver decahedrons for multiple rounds to obtain a silver nanorod aqueous solution II;
   c. thoroughly dissolving silver nitrate and the surfactant C into dimethylformamide (DMF) to obtain a solution III; thoroughly washing the silver nanorod aqueous solution II, adding a surface treatment agent F to obtain a solution IV, and treating an originally smooth surface of the silver nanorod by using the surface treatment agent F to form one or more surface defects after washing; thoroughly mixing the silver nanorod with the solutions III and IV, and placing the mixture under a condition of 60-150° C. for reaction, wherein free silver ions are reduced at the defect, and a triangular plate is formed under an adsorption effect of C, that is, a plasmonic nanonail DMF-water mixed solution is obtained; and
   d. adding 1.5% agarose gel into a casting tank of an electrophoresis tank, letting the agarose gel stand at room temperature until the agarose gel is completely solidified, removing a tape, placing the agarose gel and an inner tank into the electrophoresis tank, adding an electrophoresis buffer solution to 1-2 mm above a cassette, adding the plasmonic nanonail DMF-water mixed solution to a sample tank of the cassette, and energizing the electrophoresis tank for electrophoresis, wherein because a particle size of nanosphere particles is much smaller than that of the nanonail, and a movement speed of the nanospheres is much higher than that of the nanonail, so that by using an electrophoresis method impurities comprising the nanospheres are separated from the nanonail to obtain uniformly dispersed plasmonic nanonails to further achieve the controllable morphology,
   wherein the nanonail comprises a structure composed of the nanorod and the triangular plate, wherein each end of the nanorod comprises a point and the triangular plate is attached to a side of the nanorod.

2. The large-scale controllable preparation method for a plasmonic nanonail structure according to claim 1, wherein the weak reducing agent A is sodium citrate, glucose or ascorbic acid, the photocatalyst B is L-arginine, the strong reducing agent D is sodium borohydride, potassium borohydride or lithium aluminum hydride, and the etchant E is hydrogen peroxide.

3. The large-scale controllable preparation method for a plasmonic nanonail structure according to claim 1, wherein the surfactant C is polyvinylpyrrolidone (PVP) with a molecular weight of 40,000-1,300,000 Daltons and more, or sodium polyvinyl sulfonate PSS and polyacrylic acid (PAA).

4. The large-scale controllable preparation method for a plasmonic nanonail structure according to claim 1, wherein the surface treatment agent F is acetone, toluene, cyclopentanone, DMF, hydrogen peroxide, hydrochloric acid or nitric acid, wherein concentrations of the surface treatment agent in the solution IV range from 0.001-10 mmol/L.

5. The large-scale controllable preparation method for a plasmonic nanonail structure according to claim 1, wherein a ratio of amounts of substances of the silver nitrate solution, a PVP solution, and the nanorod solution is 400: (20-500): (0.01-10).

6. The large-scale controllable preparation method for a plasmonic nanonail structure according to claim 1, wherein a thickness of the silver nanorod is controllably changed by changing a size of a decahedral seed, a small diameter of the seed indicates a thin prepared nanorod, and a large diameter of the seed indicates a thick prepared nanorod; and when the diameter of the nanorod is approximately 20 nanometers, a resonance peak of a spectral characteristic curve is located at approximately 400 nanometers, and when the diameter of the nanorod is approximately 60 nanometers, the resonance peak may be red-shifted to 420 nanometers.

7. The large-scale controllable preparation method for a plasmonic nanonail structure according to claim 1, wherein when the weak reducing agent A is sodium citrate and the strong reducing agent D is sodium borohydride, a ratio of amounts of substances of sodium citrate, L-arginine, silver nitrate and sodium borohydride is 1.68:(0.001-5):(0.05-10):(0.05-10).

8. The large-scale controllable preparation method for a plasmonic nanonail structure according to claim 1, wherein when the surfactant C is PVP, and concentrations of the added PVP in the silver decahedral core aqueous solution I, the silver nanorod aqueous solution II and the solution III range from 0.001-1 mmol/L.

9. A large-scale controllable preparation method for synthesizing a gold-silver alloy-type plasmonic nanonail with a gold nanorod as a backbone, wherein the method comprises:
   a. preparing a mixed aqueous solution of a weak reducing agent A and tetrachloroauric acid, and then, adding a strong reducing agent I into the mixed aqueous solution to thoroughly react to obtain a gold decahedral core aqueous solution V;
   b. preparing an aqueous solution of the weak reducing agent A, the tetrachloroauric acid, and a surfactant K, and adding the gold decahedral core solution V into the aqueous solution multiple times to chemically reduce the gold decahedral core solution V, wherein a reduced elemental gold grows for multiple rounds along a longitudinal axis of a gold decahedron to obtain a gold nanorod aqueous solution VI;
   c. thoroughly dissolving silver nitrate and a surfactant C into dimethylformamide (DMF) to obtain a solution III; thoroughly washing the gold nanorod aqueous solution VI, adding a amount of surface treatment agent F to obtain a solution VII, and treating an originally smooth surface of the gold nanorod by using the surface treatment agent F to form one or more surface defects after washing; thoroughly mixing the gold nanorod with the solutions III and VII, and placing the mixture under a condition of 60-150° C. for reaction, wherein free silver ions are reduced at the defect, and a triangular plate is formed under a adsorption effect of C, that is, a gold-silver alloy-type plasmonic nanonail DMF-water solution is obtained; and d. adding 0.5%-3% agarose gel into a casting tank of an electrophoresis tank, letting the agarose gel stand at room temperature until the agarose gel is completely solidified, removing a tape, placing the agarose gel and an inner tank into the electrophoresis tank, adding an electrophoresis buffer solution to 1-2 mm above a cassette, adding the gold-silver alloy-type plasmonic nanonail DMF-water solution to a sample tank of the cassette, and energizing the electrophoresis tank for electrophoresis, wherein because a particle size of nanosphere particles is much smaller than that of the nanonail, and a movement speed of the nanospheres is much higher than that of the nanonail, so that by using an electrophoresis method impurities comprising the nanospheres are separated from the nanonail to obtain uniformly dispersed gold-silver alloy-type plasmonic nanonails to further achieve the controllable morphology, wherein the nanonail comprises a structure composed of the nanorod and the triangular plate, wherein each end of the nanorod comprises a point and the triangular plate is attached to a side of the nanorod.

10. The large-scale controllable preparation method for a plasmonic nanonail structure according to claim 9, wherein the weak reducing agent A is sodium citrate, glucose or ascorbic acid.

11. The large-scale controllable preparation method for a plasmonic nanonail structure according to claim 9, wherein the surfactant C is polyvinylpyrrolidone (PVP) with a molecular weight of 40,000-1,300,000 Daltons and more, or sodium polyvinyl sulfonate PSS and polyacrylic acid (PAA).

12. The large-scale controllable preparation method for a plasmonic nanonail structure according to claim 9, wherein the surface treatment agent F is acetone, toluene, cyclopentanone, DMF, hydrogen peroxide, hydrochloric acid or nitric acid, wherein concentrations of the surface treatment agent in the solution VII range from 0.001-10 mmol/L; and the surfactant K is CTAB or CTAC.

13. The large-scale controllable preparation method for a plasmonic nanonail structure according to claim 9, wherein a ratio of amounts of substances of the silver nitrate solution, a PVP solution, and the nanorod solution is 400: (20-500): (0.01-10).

14. The large-scale controllable preparation method for a plasmonic nanonail structure according to claim 9, wherein a thickness of the gold nanorod is controllably changed by changing a size of a decahedral seed, a small diameter of the seed indicates a thin prepared nanorod, and a large diameter of the seed indicates a thick prepared nanorod; and when the diameter of the nanorod is approximately 20 nanometers, a resonance peak of a spectral characteristic curve is located at approximately 400 nanometers, and when the diameter of the nanorod is approximately 60 nanometers, the resonance peak may be red-shifted to 420 nanometers.

15. A large-scale controllable preparation method for synthesizing a silver-gold-silver alloy-type plasmonic nanonail with a silver-gold-silver alloy nanorod as a backbone, wherein the method comprises:

a. adding a amount of cationic surfactant cetyltrimethylammonium chloride (CTAC) solution to a gold nanorod aqueous solution VI to make a concentration of CTAC in the gold nanorod aqueous solution range from 0.05-2 mol/L, wherein CTAC with a high concentration is adsorbed on a surface of the gold nanorod, reduces a zeta potential of the gold nanorod, and flocculates, thereby effectively extracting the gold nanorod; formulating the extracted gold nanorod to a benzyldimethylhexadecyl ammonium chloride (BDAC) solution with a concentration of 0.01-10 mmol/L, adding silver nitrate and a weak reducing agent A solution separately and simultaneously into the benzyldimethylhexadecyl ammonium chloride (BDAC) solution at a rate of 100-400 µL/h, and thoroughly reacting at a temperature of 40-100° C. for 2-6 h, wherein silver ions are reduced by A and grow along two ends of the gold nanorod to obtain a silver-gold-silver alloy nanorod solution VIII by a chemical reduction method;

b. thoroughly mixing and stirring silver nitrate and a DMF solution of a surfactant C to obtain a solution III; thoroughly washing the silver-gold-silver alloy nanorod aqueous solution VIII at a speed, adding a amount of surface treatment agent F, treating an originally smooth surface of the alloy nanorod by using the surface treatment agent F to form one or more surface defects after washing, and obtaining a solution IX; thoroughly mixing the solutions IX and III, and placing the mixture under a condition of 60-150° C. for reaction to obtain a silver-gold-silver alloy-type plasmonic nanonail DMF-water solution; and c. adding 1.5% agarose gel into a casting tank of an electrophoresis tank, letting the agarose gel stand at room temperature until the agarose gel is completely solidified, removing a tape, placing the agarose gel and an inner tank into the electrophoresis tank, adding an electrophoresis buffer solution to 1-2 mm above a cassette, adding the silver-gold-silver alloy-type plasmonic nanonail DMF-water solution to a sample tank of the cassette, and energizing the electrophoresis tank for electrophoresis, wherein because a particle size of nanosphere particles is much smaller than that of the nanonail, and a movement speed of the nanospheres is much higher than that of the nanonail, so that by using an electrophoresis method impurities comprising the nanospheres are separated from the nanonail to obtain uniformly dispersed silver-gold-silver alloy-type plasmonic nanonails to further achieve the controllable morphology, wherein the nanonail comprises a structure composed of the nanorod and the triangular plate, wherein each end of the nanorod comprises a point and the triangular plate is attached to a side of the nanorod.

16. The large-scale controllable preparation method for a plasmonic nanonail structure according to claim 15, wherein the weak reducing agent A is sodium citrate, glucose or ascorbic acid.

17. The large-scale controllable preparation method for a plasmonic nanonail structure according to claim 15, wherein the surfactant C is polyvinylpyrrolidone (PVP) with a molecular weight of 40,000-1,300,000 Daltons and more, or sodium polyvinyl sulfonate PSS and polyacrylic acid (PAA).

18. The large-scale controllable preparation method for a plasmonic nanonail structure according to claim 15, wherein the surface treatment agent F is acetone, toluene, cyclopentanone, DMF, hydrogen peroxide, hydrochloric acid or nitric acid, wherein concentrations of the surface treatment agent in the solution IX range from 0.001-10 mmol/L.

19. The large-scale controllable preparation method for a plasmonic nanonail structure according to claim 15, wherein a ratio of amounts of substances of the silver nitrate solution, a PVP solution, and the nanorod solution is 400: (20-500): (0.01-10).

20. The large-scale controllable preparation method for a plasmonic nanonail structure according to claim 15, wherein a thickness of the silver-gold-silver alloy nanorod is controllably changed by changing a size of a decahedral seed, a small diameter of the seed indicates a thin prepared nanorod, and a large diameter of the seed indicates a thick prepared nanorod; and when the diameter of the nanorod is approximately 20 nanometers, a resonance peak of a spectral characteristic curve is located at approximately 400 nanometers, and when the diameter of the nanorod is approximately 60 nanometers, the resonance peak may be red-shifted to 420 nanometers.

* * * * *